June 24, 1947. E. C. HEAD Re. 22,891
GEAR CUTTER
Original Filed March 2, 1936 2 Sheets-Sheet 1
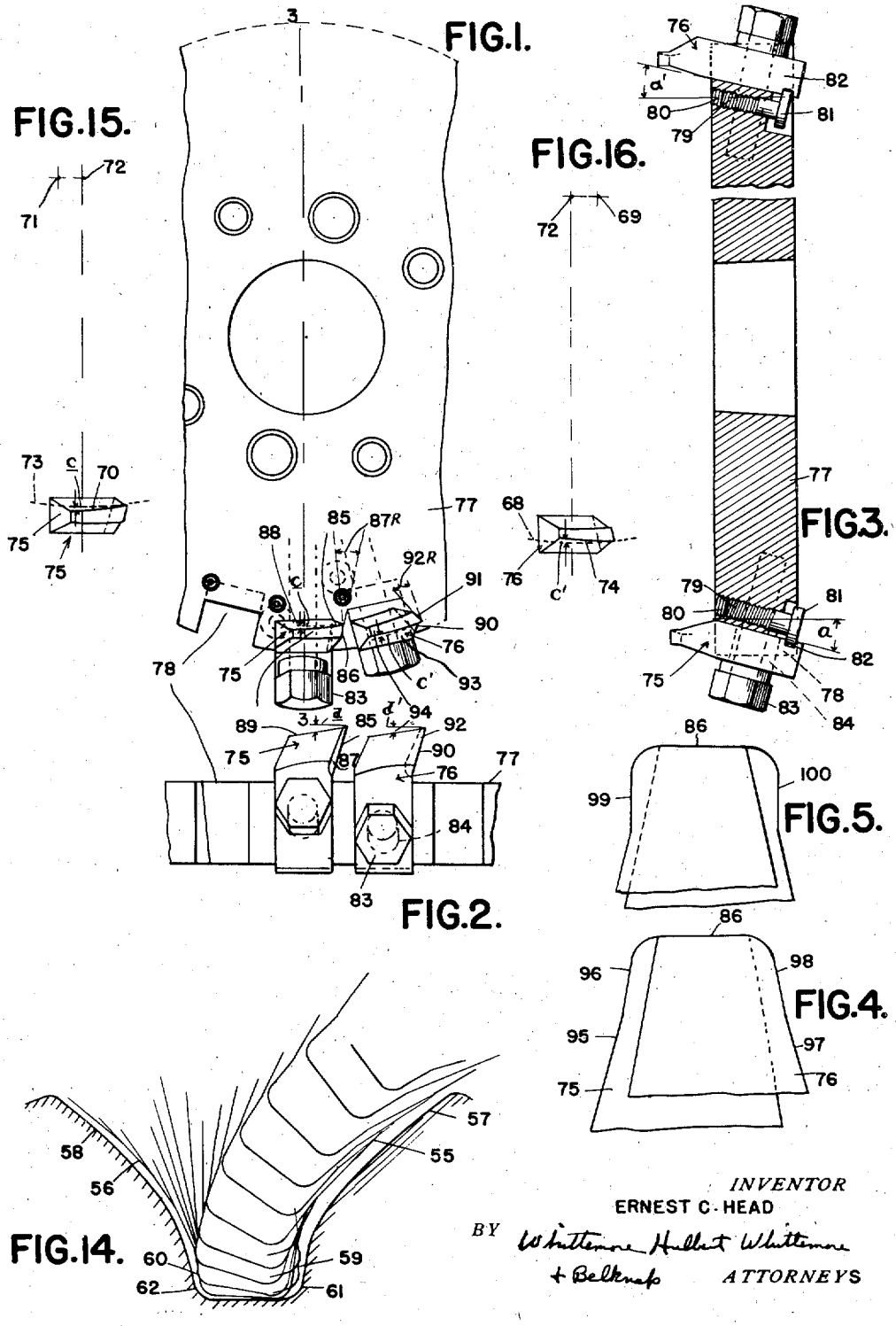
INVENTOR
ERNEST C. HEAD
BY Whittemore Hulbert Whittemore + Belknap ATTORNEYS June 24, 1947. E. C. HEAD Re. 22,891
GEAR CUTTER
Original Filed March 2, 1936 2 Sheets-Sheet 2
FIG.6.
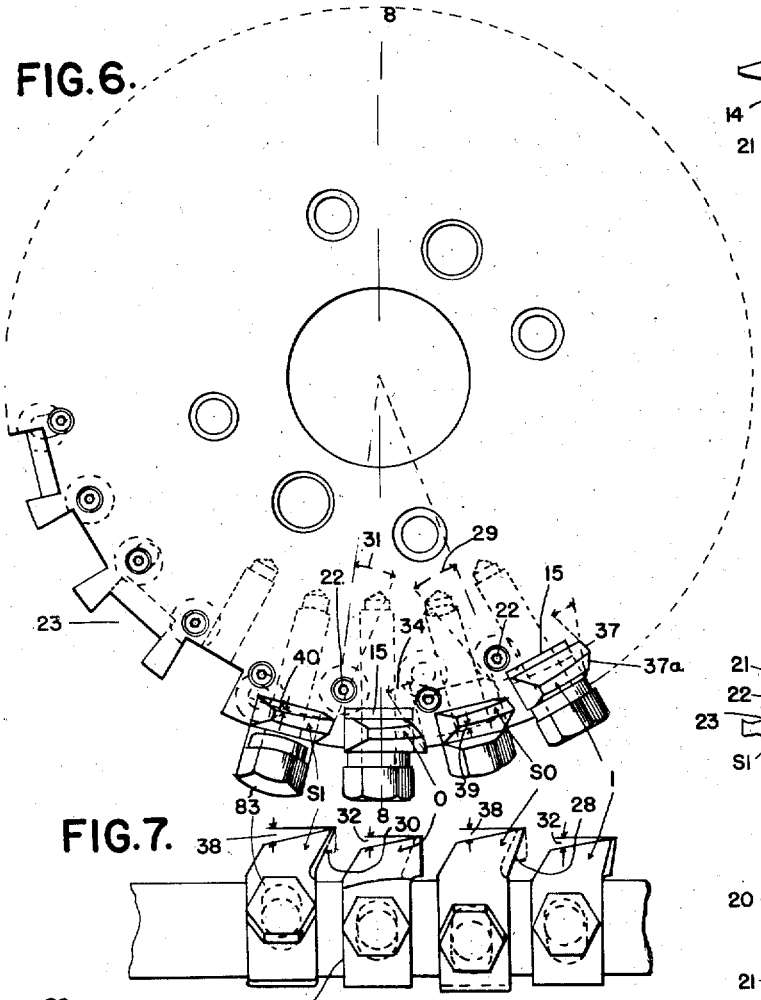
FIG.7.
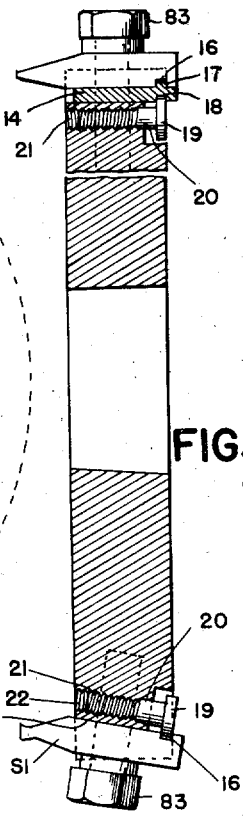
FIG.8.
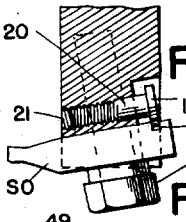
FIG.9.
FIG.12.
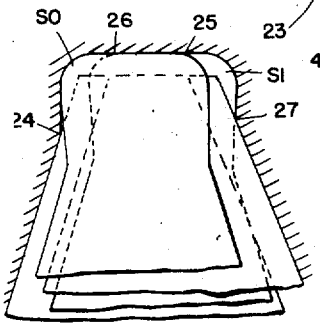
FIG.10.
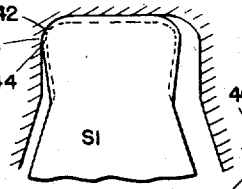
FIG.11.
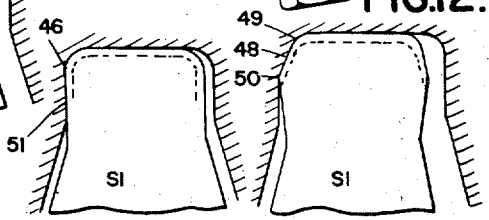
FIG.13.
INVENTOR
ERNEST C. HEAD
BY Whittemore Hulbert Whittemore & Belknap ATTORNEYS Reissued June 24, 1947

Re. 22,891

UNITED STATES PATENT OFFICE 22,891

GEAR CUTTER

Ernest C. Head, deceased, late of Detroit, Mich., by Gleason Works, Rochester, N. Y., assignee Original No. 2,270,003, dated January 13, 1942, Serial No. 66,672, March 2, 1936. Application for reissue September 14, 1945, Serial No. 616,448

7 Claims. (Cl. 29—105)

The invention relates to face mill cutters for cutting spiral bevel gears, pinions and the like, and is more particularly concerned with face mill cutters designed for rough cutting the gears prior to the finish cutting operation. Some of the features of the invention are improvements on or are related to the invention of the application of said Ernest Head, Serial No. 25,061, filed June 5, 1935, now abandoned.

The invention also relates to an improved method of rough cutting spiral bevel gears by means of which the finish cutting of the gears can be done more expeditiously and a greater amount of finish cutting performed with the finishing cutters before it is necessary to sharpen the cutter blades thereof.

The principal object of the invention is to provide a face mill gear cutter whose blades have a definite and ample amount of side or radial clearance regardless of the amount of top clearance, which gear cutter has provision for maintaining a fixed diameter and width of slot.

Another object of the invention is to provide a roughing cutter in which the blades are so sharpened that the bottom of the slot in the gear is cut to a width more closely approximating the desired width in the finished gear than the side portions of the slot. One of the purposes of this construction is to enable the tips of the blades in the finishing cutter to do relatively less work than the sides of the blades, thereby materially increasing the life of the finishing cutter blades. With a roughing cutter constructed in this manner it is a feature of this invention that means are provided for radially adjusting the inside and outside blades in order that the predetermined diameter and width of the bottom of the slot may be maintained when the blades are sharpened back.

The general objectives of the invention mentioned above may be obtained by means of various different constructions, and in the detailed description as hereinafter set forth reference will be made to a plurality of constructions differing considerably in some respects but having in common certain novel inventive features.

Reference should be made to the drawings, in which

Figure 1 is a plan view of a face mill cutter embodying the invention with representative cutter blades shown in position;

Figure 2 is a partial side view thereof in development;

Figure 3 is a sectional view on the line 3—3 of

Figure 1 illustrating the relative adjustment of the inside and outside cutting blades;

Figure 4 is a diagrammatic view illustrating the superposed cutting blades in relation to the slot which they are designed to cut;

Figure 5 is a similar view showing blades of a modified shape;

Figure 6 is a plan view of a modified face mill cutter employing separate slotting and side cutting blades;

Figure 7 is a partial side view thereof in development;

Figure 8 is a sectional view on the line 8—8 of Figure 6 illustrating the relative adjustment between slotting and side cutting blades;

Figure 9 is a fragmentary sectional view showing the adjustment of another slotting blade;

Figure 10 is a diagrammatic view illustrating the superposed cutting blades adjusted to form a roughing cutter;

Figure 11 is an enlarged end view of the cutting point of one of the slotting blades;

Figure 12 is a similar view of a modified construction;

Figure 13 is a similar view of a further modification;

Figure 14 is a diagrammatic view showing successive positions of the cutter during the generating motion when cutting a pinion;

Figure 15 is a top view of the inside blade 75 illustrating the method of obtaining the radial clearance C;

Figure 16 is a similar view of the outside blade 76 showing the method of obtaining the radial clearance $c'$.

A face mill cutting tool constructed in accordance with one form of the invention is illustrated in Figures 1 to 4. In this cutter the alternate blades are inside cutting blades 75 and outside cutting blades 76. These blades are arranged in an annular series in the cutter head 77 and extend in a direction generally parallel to the axis of the head when viewed from the side of the head, Figure 2, but are inclined with respect to the axis of the head when viewed in the cross section, Figure 3. The inside blades 75 are inclined with respect to the axis at an angle $a$ so that the blades are pointing inwardly, while the outside blades 76 are inclined at an angle $a'$ so that the blades are pointing outwardly. The blades are mounted in slots 78 on the outside diameter of the head and are slidable in the slots to permit the desired adjustment. An adjusting screw 79 engages a threaded aperture 80 paralleling the inclination of the blade and has an enlarged head 81 engageable in a recess 82 in the shank of the blade. Each blade is secured in adjusted position by a bolt 83, the head of which bears against the outside face of the shank. An elongated aperture 84 in the shank is of sufficient length to permit the desired range of adjustment.

The inside cutting blade 75 has an inside cutting edge 85 and a top cutting edge 86 formed by the intersection of the front face 87 with the inside face 88 and top cutting face 89 respectively. Correspondingly the outside blade 76 has an outside cutting edge 90 and a top cutting edge 91 formed by the intersection of the front face 92 with the outside face 93 and the top face 94 respectively. The front faces 87 and 92 of the inside and outside blades are inclined at rake angles $87^R$ and $92^R$ respectively which are in opposite directions in the two blades. The inside face 88 of the inside blade 75 is relieved back of the cutting edge 85 to form side clearance, and the side clearance angle is indicated at *c*, Figure 1. The corresponding relief in the outside surface 93 of the outside blade 76 forms the side clearance angle *c'*. The top face 89 of the inside blade has a top clearance angle indicated at *d*, Figure 2, while the top face 94 of the outside blade has a top clearance angle *d'*.

The position of the inside and outside blades in relation to the slot to be cut is shown diagrammatically in Figure 4 where it will be readily seen that the inside of the slot is formed by the inside blade 75 only, and the outside of the slot is formed by the outside blade 76 only. In one form of the present invention the cutting portions of the blades have the top end portions thereof shaped to produce an enlarged width of slot at the bottom thereof. Thus the inside blade has the straight line portion 95 for cutting the inside of the slot but has a portion 96 of different shape at the top of the blade which merges with the top cutting edge 86. As shown in Figure 4, the portion 96 has an inclination less than the inclination of portion 95 and is curved at its juncture with the top edge 86 to form a rounded corner where it joins top edge 86. The outside blade 76 also has a top edge 86, a straight side cutting portion 97, and a shaped top portion 98 of lesser pressure angle which is curved at its juncture with top edge 86 to form a rounded corner where it joins said top edge. These shaped portions 96 and 98 may be termed slotting portions of the blades since they produce an enlarged width at the bottom of the slot. The slotting portions of the blades may, if desired, extend at right angles to the edge 86 as illustrated in Figure 5 at the points 99 and 100, in which case there will be no side clearance component due to the top clearance. Also the portions 96 and 98 of the blades may be otherwise shaped to remove a larger amount of stock at the bottoms of the slots than would be obtained if the blades maintained the straight lines 95 and 97 to the top edges thereof.

Figure 15 illustrates the method of obtaining the radial clearance *c* on the inside blade 75. As mentioned above in connection with Figure 5, when the shaped portions 99 and 100 are at right angles to the top edge 86, there is no side clearance component due to the top clearance. This portion of such a blade would cut an annular slot having straight side walls. Also blades having the top portions 96 and 98, Figure 4, of slight angle would cut materially an annular slot. It will be seen that all points of this blade back of the cutting edge must travel around the annular slot cut by the blade and have clearance so no rubbing action takes place between the blade and the work. Therefore, the blade must have a top clearance *d* and a side clearance from front to back *c* as shown by the line 70. The line 70 as will be seen from Figure 15 is struck from a center 71 offset back from the center 72 of the cutting tool so that as the front cutting edge travels in a true circular path indicated by the dotted line 73 the rear edge of the blade has side clearance with respect thereto. It will thus be seen that when the inside blade is sharpened back, it will cut the inner wall of the slot to a greater diameter.

Figure 16 is a corresponding view of the outside blade 76. This blade must have a top clearance *d'* and a side clearance from front to back *c'* as shown by the line 74. The line 74 is struck from a center 69 offset forwardly from the center 72 so that as the front cutting edge travels in a true circular path indicated by the dotted line 68, the rear edge of the blade has side clearance with respect thereto. It will thus be seen that when the outside blade is sharpened back, it will cut the outer wall of the slot to a smaller diameter.

The curved line 70 of the inside blade and the curved line 74 of the outside blade may be obtained in any suitable manner in order to properly provide the necessary radial clearance *c* and *c'*. One method of grinding this relief is shown in the above mentioned application, Serial No. 25,061, filed June 3, 1935.

In accordance with the present invention, means is provided so that substantially a fixed diameter and width of slot will be obtained regardless of how far the blades are sharpened back. This is done by adjusting the inside blade in the direction of the angle *a* and the outside blade in the direction of the angle *a'*. These angles are predetermined from the clearance angles of the cutting blades and may be determined by certain formulas. The formula for the inside blades is:

$$\text{tangent } a = \frac{\text{tangent } c}{\text{tangent } d}$$

The formula for the outside blades is:

$$\text{tangent } a' = \frac{\text{tangent } c'}{\text{tangent } d'}$$

From these formulas the values of the angles *a* and *a'* may be determined and the slots in the cutter head 77 constructed to correspond with these angles.

One of the advantages of a cutter head constructed in this manner is that when the blades are sharpened back, they may be easily adjusted in the slots to obtain a fixed diameter and width of slot. Thus it is only necessary to adjust each of the blades so that the tips of the blades are at a fixed axial distance from the cutter head which may readily be obtained by a gauge block and the desired diameter and width of slot will automatically be obtained. Each time the blades are sharpened back they are adjusted in this manner to the fixed axial distance and the cutter is then ready for use.

With a face mill cutter as above described, the inside blade 75 cuts the bottom and inside of the slot, while the outside blade 76 cuts the bottom and outside of the slot. With respect to the finished dimensions of the slot, there is more stock removed at the bottom than at the sides so that in the finishing operation whether it be by means of a finishing face mill cutter or by means of a grinding wheel, less stock is required to be removed at the bottom of the slot than at the sides thereof. This effects a material saving in the life of the finishing apparatus since it is at the points of the cutting blades, or the grinding wheel, as the case may be, where the most severe wear occurs.

A modified form of face mill cutter is illustrated in Figures 6 to 9. In this form of the invention four different kinds of blades are used for cutting different portions of the profile of the slot. Two of these blades are termed "slotting blades" since they are used for cutting only in the bottom of the slot. The other two blades are termed "side cutting blades" and one is adapted for cutting the inside profile of the slot and the other the outside. The two slotting blades are also designed so that one cuts the inside bottom portion of the slot and the other the outside bottom portion. The blades may be grouped together in different ways, but as illustrated the order is first a slotting blade, then a side cutting blade, then a slotting blade, etc. Thus as shown in Figures 6 and 7, I represents an inside side cutting blade, SO represents the outside slotting blade, O is the outside side cutting blade and SI is the inside slotting blade. All of the blades are held in the blade holders in the head by means of clamping bolts 33.

The side cutting blades may be positioned radially in any suitable manner such as by employing shims 14 and 15 in the back of the slots forming the blade holders. The side cutting blades are also arranged to provide an axial adjustment and for this purpose the shank of the blade is provided with a transverse groove 16 for receiving the projecting lip 17 of the shim 14. This shim 14 is in turn provided with a recess 18 in which the head 19 of the adjusting screw 20 engages. The adjusting screw is threaded in an axially extending threaded hole 21 and is provided with a socket head 22 by which adjustment is made from the top of the cutter head.

The slotting blades are also adjustable in the head but preferably in such a manner as to adjust the same not only axially but also radially. Accordingly the slots 23 forming the blade holders are arranged at an angle, the inside slotting blade SI pointing inwardly and the outside slotting blade SO pointing outwardly. The adjusting screws for the slotting blades are threadedly adjusted in a direction parallel to the respective slotting blades so that the head 19 of the adjusting screw may directly engage the recess 16 in the shank of the blade.

Figure 10 shows the relative positions of the four types of cutter blades during one type of cutting operation. The slotting blade SO is adapted to cut that portion of the slot from the point 24 to the point 25. The inside slotting blade SI cuts the portion of the slot from the point 26 to the point 27. The inside blade I cuts the surface of the slot from the point 27 to the top of the slot, whereas the outside blade O cuts the surface of the slot from the point 24 to the top of the same.

The primary advantage of the use of the two overlapping slotting blades for the outside and inside slotting respectively is that it enables the slot width to be maintained constant after the slotting blades become worn and require resharpening. To do this the slotting blades SI and SO are adjusted by their respective adjusting screws and because of the angle of these blades in the cutter head, the inside slotting blade will be thereby moved radially inward as well as axially, while the outside slotting blade will be moved radially outward as well as axially. To compensate for the axial movement of the slotting blades the side cutting blades O and I may be correspondingly adjusted in an axial direction.

Another advantage of the use of two slotting blades is that it enables the most desirable shear and rake angles to be ground on both the outside and inside slotting blades. Thus as illustrated, 28 represents the front rake angle of the outside slotting blade and 29 represents the side shear angle. The inside slotting blade SI is made with a front rake angle 30 and a side shear angle 31.

The inside and outside side cutting blades are similar to the conventional blades used in face mill cutters and can be made by the usual methods of construction. However, the clearance angles for the top clearance may be constructed to be of the theoretically correct angle for most efficient cutting whereas in the blades heretofore made the clearance angles have necessarily been a compromise due to the fact that in the conventional blade which cuts on the side 37 and the top 37*a* simultaneously, the top clearance angle 32 must be great enough to give sufficient side clearance. In other words, the side clearance angle is a component of the top clearance angle 32 and varies with the tangent of the pressure angle. Therefore, if angle 32 is made large enough to give the proper side clearance, then angle 32 is too great for efficient top cutting and conversely, if angle 32 is made correct for top cutting, then side clearance is not sufficient for side cutting.

As the side cutting blades in the improved cutter do not cut on the top 37 it will be apparent that the clearance angle 32 in the blades is made sufficient to give the most efficient side clearance. Also, side rake angle 34 is made according to the best known practice for a side cutting tool without requiring modification because of any top cut.

All points of each of the slotting blades SO and SI back of the cutting edges must travel around the annular slot cut by the blades and have clearance so that no rubbing action takes place between the blades and the work. Therefore each blade must have a top clearance 38, slotting blade SO must have on the outside surface a side clearance 39 from front to back, and inside blade SI must have the side clearance 40 on the inside surface. The front rake angle ground on each of the slotting blades is different, the outside slotting blade having the front rake angle 28 and the inside slotting blade having the rake angle 30. The side shear angles are different on the two slotting blades, the outside slotting blade having the side shear angle 29 and the inside slotting blade having the side shear angle 31. It should be observed that the top clearance angle 38 on each slotting blade is less than the top clearance angle on the side cutting blades. The top clearance angle 38 of the slotting blades can be made in accordance with the best practice suited for its particular work and need not be the same as the corresponding angle in the side cutting blades.

The side-clearance angle 40 on the inside surface of the inside slotting blade is essential to the successful operation of the cutter, and to better explain this the cutting point of the slotting blade SI has been shown in large views in Figures 11 to 13 inclusive which illustrate several forms of the invention. In Figure 11, the small radius 42 at the corner of the cutting edge stops at a point 43. In this form of the slotting blade there will be a top clearance component at the point 43. Then it is necessary to have only a slight side clearance 40 from the point 43 at the front of the blade to the point 44 at the back of the blade.

Another modified form is shown in Figure 12 in which a portion 48 of the cutting edge tangent to the radius 49 is made to angle outward to the point 50. Here again there is a side component to the top clearance angle but an additional clearance is necessary at 50 so that the blade will clear in the slot cut.

Figure 13 represents another modified form of blade similar to that disclosed in Figure 15 except that from the point 46 the side edge 51 runs straight down and side clearance back of this edge is provided.

In each of the Figures 11, 12, and 13 only the inside slotting blade SI has been shown, and it will be noted that the inside edge, which is at the left in these figures, is in contact with the slot while the other edge clears the slot. Consequently it is unnecessary to provide special clearance on the latter side of the inside slotting blade. The distance between the outside surface of the inside slotting blade and the walls of the slot is exaggerated in the drawings. The construction of the outside edge of the outside slotting blade SO complementary to the inside slotting blade SI has not been illustrated in Figures 11 to 13 but it will be understood that it will be constructed in accordance with the same principles as the blade SI.

Figure 14 illustrates the invention as applied to the rough cutting of a spiral bevel pinion whether by means of the two-blade type of cutter first described or the four-blade type of cutter subsequently described. The successive positions which the cutter will take in rolling out the curved shape of the tooth are shown. Spiral bevel pinions cut with this cutter are usually developed by the well known generating method in which the pinion is rolled with the cutter as said pinion would roll with a crown gear of the system. The cutter in this case represents the crown gear. By rolling the cutter and pinion together as shown in Figure 14, curves 55 and 56 are developed on the sides of the tooth space and fillet curves 59 and 60 are generated at the junctures of the tooth sides with the bottom of the tooth space. Curves 57 and 58 represent the shape of the sides while curves 61 and 62 represent the shape of the fillet portions of the finished tooth space. These curves are such as would be generated by a conventional finishing cutter having cutting edges of one pressure angle for their full height, and they illustrate the amount of stock left for the finishing cutter to remove after the rough-generating operation.

It will be seen that each side of the roughed tooth space is really generated with a cutter having one pressure angle for the main portion of its height and having a protruding portion at its tip. The upper side cutting portions generate curves 55 and 56 of a given pressure angle and the rounded corners at the tips of the blades generate curves 59 and 60. The fact that the corners at the points of the roughing blades project laterally beyond the side-cutting edges of the blades means that different fillet curves 59, 60 are generated in the bottom of a tooth space by the roughing cutter than the fillet curves 61, 62 generated by the finishing cutter. The nature of the fillet curve generated in the roughing operation is such that more stock is removed than would be if the blade had the same pressure angle at the point as along the rest of its height. Therefore the corners of the cutting blades of the roughing cutter undercut a greater amount and leave a minimum amount of stock for the finishing cutter to remove between surfaces 59 and 61 and also between surfaces 60 and 62. The amount of stock left for finishing is greater between curves 55 and 57 and also between curves 56 and 58, and is uniform for these portions of the tooth space. While the generation of pinions in the manner illustrated in Figure 14 is usually employed for the rough cutting operation, it should be understood that a cutter designed to operate in the same manner may also be used for finish cutting if it is desirable to give extra relief or clearance at the bottom of the tooth.

In the preceding description of the various modifications of the invention, it has been shown that the invention may be embodied in cutters differing considerably in their specific constructions. In every case, however, there are certain underlying novel features, the chief of which is the provision of means for maintaining a fixed diameter and width of slot when the cutter blades are resharpened.

What is claimed as the invention is:

1. A face mill gear cutter, comprising a rotary head and a plurality of annularly arranged cutting blades which are secured thereto and extend in a direction generally parallel to the axis of the head when viewed from one side of the head, but which are inclined to the axis of the head when viewed in a cross-section through the axis of rotation of the head, each of said blades having a side surface which has a top portion and a bottom portion, both of said portions having positive pressure angles, said top portion having a pressure angle less than that of said bottom portion, each blade being relieved on said side surface back of its front face to provide cutting clearance.

2. A face mill gear cutter comprising a rotary head and a plurality of annularly arranged cutting blades secured thereto which extend in the direction of the axis of rotation of said head when viewed from one side of the head, but which are inclined to the axis of the head in a cross-section through the head, the cutting part of each of said blades having a side surface which has a top portion and a bottom portion, the bottom portion extending for the greater part of the height of the cutting part of the blade and having a straight profile of positive pressure angle, and the top portion being of different and lesser pressure angle than the pressure angle of the bottom portion.

3. A face mill gear cutter comprising a rotary head and a plurality of annularly arranged cutting blades, certain of the blades being outside blades and others of the blades being inside blades, the outside blades having outside surfaces of two different pressure angles and the inside blades having inside surfaces of two different pressure angles, the outside surfaces, which are of smaller pressure angle, being relieved radially inwardly back of their front faces and the inside surfaces, which are of smaller pressure angle, being relieved radially outwardly back of their front faces, the blades which have the outside surfaces of smaller pressure angle being mounted in the cutter head to be inclined to and to extend outwardly from the cutter axis and to be adjustable in the direction of their inclination, and the blades, which have the inside surfaces of smaller pressure angle, being mounted in the cutter head to be inclined to and to extend inwardly toward the cutter axis and to be adjustable in the direction of their inclination.

4. A face mill gear cutter comprising a rotary head and a plurality of annularly arranged cutting blades which have tip and side edges, certain of the blades being outside blades and others of the blades being inside blades, the outside blades having outside surfaces of two different pressure angles and the inside blades having inside surfaces of two different pressure angles, the outside surfaces, which are of smaller pressure angle, being relieved radially inwardly behind their side edges, the inside surfaces, which are of smaller pressure angle, being relieved radially outwardly behind their side edges, the blades, which have the outside surfaces of smaller pressure angle, being mounted in the cutter head to be inclined to and to extend outwardly from the axis of the cutter and to be adjustable in the direction of their inclination, and the blades, which have inside surfaces of smaller pressure angle, being mounted in the cutter head to be inclined to and to extend inwardly toward the axis of the cutter and to be adjustable in the direction of their inclination, the tips of the blades being relieved back of their tip edges to provide cutting clearance, the clearance angle on the tips of the blades being different from the clearance angles on the sides of the blades.

5. A face mill gear cutter comprising a rotary head and a plurality of annularly arranged cutting blades, certain of the blades being outside cutting blades and others of the blades being inside cutting blades, certain of the blades being outside slotting blades and others of the blades being inside slotting blades, the outside and inside cutting blades extending in the general direction of the axis of the cutter head and the outside and inside slotting blades being inclined outwardly and inwardly, respectively, with reference to the axis of the cutter head and being adjustable in the cutter head in the directions of their inclinations, the slotting blades having outside and inside surfaces of smaller pressure angle, respectively, than the corresponding side surfaces of the side-cutting blades, the outside slotting blades being relieved on their outside surfaces axially and radially inwardly back of their front faces, and the inside slotting blades being relieved on their inside surfaces axially and radially outwardly back of their front face.

6. A face mill cutter comprising a rotary head and a plurality of annularly arranged cutting blades, certain of the blades being outside blades and others of the blades inside blades, all of the blades being relieved on their tip surfaces back of their front faces, the outside blades having outside surfaces of two different pressure angles and being relieved on said side surfaces axially and radially inwardly back of their front faces, the inside blades having inside surfaces of two different pressure angles and being relieved on said side surfaces axially and radially outwardly back of their front faces, the outside blades being mounted in the cutter head to be inclined radially outwardly with reference to the axis of the cutter head, and the inside blades being mounted in the cutter head to be inclined radially inwardly with reference to the axis of the cutter head, the outside and inside blades being adjustable in the cutter head in the directions of their respective inclinations.

7. A face mill cutter comprising a rotary head and a plurality of annularly arranged cutting blades, certain of the blades being outside blades and others of the blades inside blades, all of the blades being relieved on their tip surfaces back of their front faces, the outside blades having outside surfaces of two different pressure angles and being relieved on said side surfaces axially and radially inwardly back of their front faces, the inside blades having inside surfaces of two different pressure angles and being relieved on said side surfaces axially and radially outwardly back of their front faces, the outside blades being mounted in the cutter head to be inclined radially outwardly with reference to the axis of the cutter head and the inside blades being mounted in the cutter head to be inclined radially inwardly with reference to the axis of the cutter head, the outside and inside blades being adjustable in the cutter head in the directions of their respective inclinations and the clearance angles on the side surfaces of the blades being different from clearance angle on the tips of the blades.

GLEASON WORKS,
*Assignee of Ernest C. Head, Deceased.*
By JAMES E. GLEASON,
*President.*

REFERENCES CITED

The following references are of record in the file of this patent:

UNITED STATES PATENTS

| Number | Name | Date |
|---|---|---|
| 2,385,220 | McMullen | Sept. 18, 1945 |